United States Patent
Das et al.

(10) Patent No.: US 9,710,528 B2
(45) Date of Patent: Jul. 18, 2017

(54) SYSTEM AND METHOD FOR BUSINESS INTELLIGENCE DATA TESTING

(71) Applicant: Wipro Limited, Bangalore (IN)

(72) Inventors: Prabhakar Das, Pune (IN); Lakshmi Ganesh, Bangalore (IN)

(73) Assignee: Wipro Limited, Bangalore (IN)

( * ) Notice: Subject to any disclaimer, the term of this patent is extended or adjusted under 35 U.S.C. 154(b) by 241 days.

(21) Appl. No.: 14/272,048

(22) Filed: May 7, 2014

(65) Prior Publication Data

US 2015/0278393 A1 Oct. 1, 2015

(30) Foreign Application Priority Data

Mar. 25, 2014 (IN) .......................... 1589/CHE/2014

(51) Int. Cl.
| | | |
|---|---|---|
| *G06F 17/00* | (2006.01) | |
| *G06F 17/30* | (2006.01) | |
| *G06F 11/36* | (2006.01) | |
| *G06Q 10/00* | (2012.01) | |

(52) U.S. Cl.
CPC .... *G06F 17/30557* (2013.01); *G06F 11/3684* (2013.01); *G06Q 10/00* (2013.01)

(58) Field of Classification Search
CPC ........... G06F 17/30563; G06F 11/3684; G06F 11/368; G06F 11/2635; G06F 17/30917; G06F 17/30864; G06F 17/30454
USPC .......................... 707/601, 602, 607, 999.102
See application file for complete search history.

(56) References Cited

U.S. PATENT DOCUMENTS

| | | | | |
|---|---|---|---|---|
| 7,203,671 | B1* | 4/2007 | Wong ................ | G06F 17/30424 |
| 7,761,841 | B1* | 7/2010 | Rexroad ............ | G06F 11/3688 |
| | | | | 717/100 |
| 8,761,659 | B1* | 6/2014 | Lebrun ................... | G09B 7/00 |
| | | | | 434/362 |
| 9,110,957 | B2* | 8/2015 | Mital ................ | G06F 17/30539 |
| 9,158,827 | B1* | 10/2015 | Vu ..................... | G06F 17/30563 |
| 2004/0093559 | A1* | 5/2004 | Amaru .............. | G06F 17/30604 |
| | | | | 715/210 |
| 2005/0262087 | A1* | 11/2005 | Wu .................... | G06F 17/30289 |
| 2007/0016829 | A1* | 1/2007 | Subramanian ...... | G06F 11/3684 |
| | | | | 714/38.1 |

(Continued)

FOREIGN PATENT DOCUMENTS

EP 2626668 A1 8/2013

*Primary Examiner* — Mohammed R Uddin
(74) *Attorney, Agent, or Firm* — LeClairRyan, a Professional Corporation

(57) ABSTRACT

Apparatuses, methods, and non-transitory computer readable medium for testing business intelligence data over a communication network include receiving a data mapping file, applicable to a source data repository and a target data repository, and generating data mapping file based on the same. Test cases are generated, based on the data mapping file, and SQL scripts, for execution of the test cases, and executing the SQL scripts on the source data repository and the target data. An online analytical processing (OLAP) cube report for the target data repository is received and the OLAP cube report and a report, which is to be tested, are compared to generate a comparison report. The comparison report is indicative of the fields of the OLAP cube report and the report, which is to be tested, which generated at least one error.

15 Claims, 3 Drawing Sheets

(56) References Cited

U.S. PATENT DOCUMENTS

| | | | | |
|---|---|---|---|---|
| 2007/0274154 A1* | 11/2007 | Simon | G06F 17/30563 | 367/38 |
| 2008/0184206 A1* | 7/2008 | Vikutan | G06F 11/3688 | 717/127 |
| 2008/0244323 A1* | 10/2008 | Kelso | G06F 11/3608 | 714/38.14 |
| 2008/0313204 A1* | 12/2008 | Schultz | G06F 17/30371 | |
| 2009/0249297 A1* | 10/2009 | Doshi | G06F 11/3672 | 717/124 |
| 2011/0060719 A1* | 3/2011 | Kapoor | G06F 17/30595 | 707/602 |
| 2011/0246415 A1* | 10/2011 | Li | G06F 17/30563 | 707/602 |
| 2012/0150820 A1* | 6/2012 | Sankaranarayanan | G06F 17/30303 | 707/690 |
| 2012/0221510 A1* | 8/2012 | Li | G06F 17/30592 | 707/602 |
| 2012/0265726 A1* | 10/2012 | Padmanabhan | G06F 17/303 | 707/602 |
| 2012/0290527 A1* | 11/2012 | Yalamanchilli | G06F 17/30592 | 707/602 |
| 2013/0325789 A1* | 12/2013 | Krishnan | G06F 17/30563 | 707/602 |
| 2014/0172512 A1* | 6/2014 | Chandra | G06Q 10/0637 | 705/7.37 |
| 2014/0180961 A1* | 6/2014 | Hankins | G06Q 10/10 | 705/348 |
| 2014/0310231 A1* | 10/2014 | Sampathkumaran | G06F 17/30563 | 707/602 |
| 2015/0026136 A1* | 1/2015 | Rathod | G06F 17/30082 | 707/692 |

\* cited by examiner

SYSTEM AND METHOD FOR BUSINESS INTELLIGENCE DATA TESTING

This application claims the benefit of Indian Patent Application No. 1589/CHE/2014 filed Mar. 25, 2014, which is hereby incorporated by reference in its entirety.

FIELD

This technology is related, in general to data processing and, in particular, but not exclusively to a method and system for testing business intelligence data.

BACKGROUND

Business intelligence may be understood to be a set of methodologies, processes, architectures, and technologies that transform raw data into meaningful and useful information which is used to enable more effective strategic, tactical, and operational insights and decision-making for an organization. The primary objective of business intelligence is to facilitate better decision-making. Generally, the process of providing business intelligence data starts with the determination of what kinds of summaries and reports the stakeholders of the organization may be interested in. Usually the stakeholders are queried to determine the types of reports and summaries that they may be interested in. Due to the amount of resources required to effect changes in the types of reports and summaries that are generated, significant care is taken in designing these reports and summaries.

In an organization, the business intelligence is usually used for decision-making in critical areas such as market research, product profitability, inventory tracking, and customer profiling. Implementing business intelligence involves data related to different factors that affect the operations of the organization or business units in the organization, for example, data about customers, competitors and business partners, financial information, details of internal operations, and the like. Typically, business intelligence is implemented through activities such as data sourcing, data warehousing, data analysis, data forecasting, and the like. Different business intelligence solutions are implemented by using technologies provided by products such as SAP™-BW, Oracle™ BI, and Seibel™ Analytics.

SUMMARY

Disclosed herein are apparatuses, methods, and non-transitory computer readable medium for testing business intelligence data. In one example, the system, for testing business intelligence data, comprises a processor, a memory communicatively coupled to the processor, wherein the memory stores processor-executable instructions, which, on execution, cause the processor to receive data mapping file, applicable to a source data repository and a target data repository, from the user and generate data transformation rules based on the data mapping file. The processor-executable instructions, on execution, further cause the processor to generate test cases, based on the data transformation rules, and SQL scripts, for execution of the test cases, execute the SQL scripts on the source and the target data repository to generate a test results report indicative of the outcome of the execution of the SQL scripts. The processor-executable instructions, on execution, further cause the processor to receive an online analytical processing (OLAP) cube report for the target data repository, and compare the OLAP cube report and a report, which is to be tested, to generate a comparison report. The comparison report is indicative of the fields of the OLAP cube report and the report, which is to be tested, which generated at least one error.

In an aspect of the invention, the method for testing business intelligence data comprises receiving a data mapping file, applicable to a source data repository and a target data repository, and data transformation rules communicating between the source and target columns. The method further comprises generating test cases, based on the data mapping file. Data Mapping file are required for generating the SQL scripts, for execution of the test cases, and executing the SQL scripts on the source data repository and the target data. The method further comprises receiving an online analytical processing (OLAP) cube report for the target data repository and comparing the OLAP cube report and a report, which is to be tested, to generate a comparison report. The comparison report is indicative of the fields of the OLAP cube report and the report, which is to be tested, which generated at least one error.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
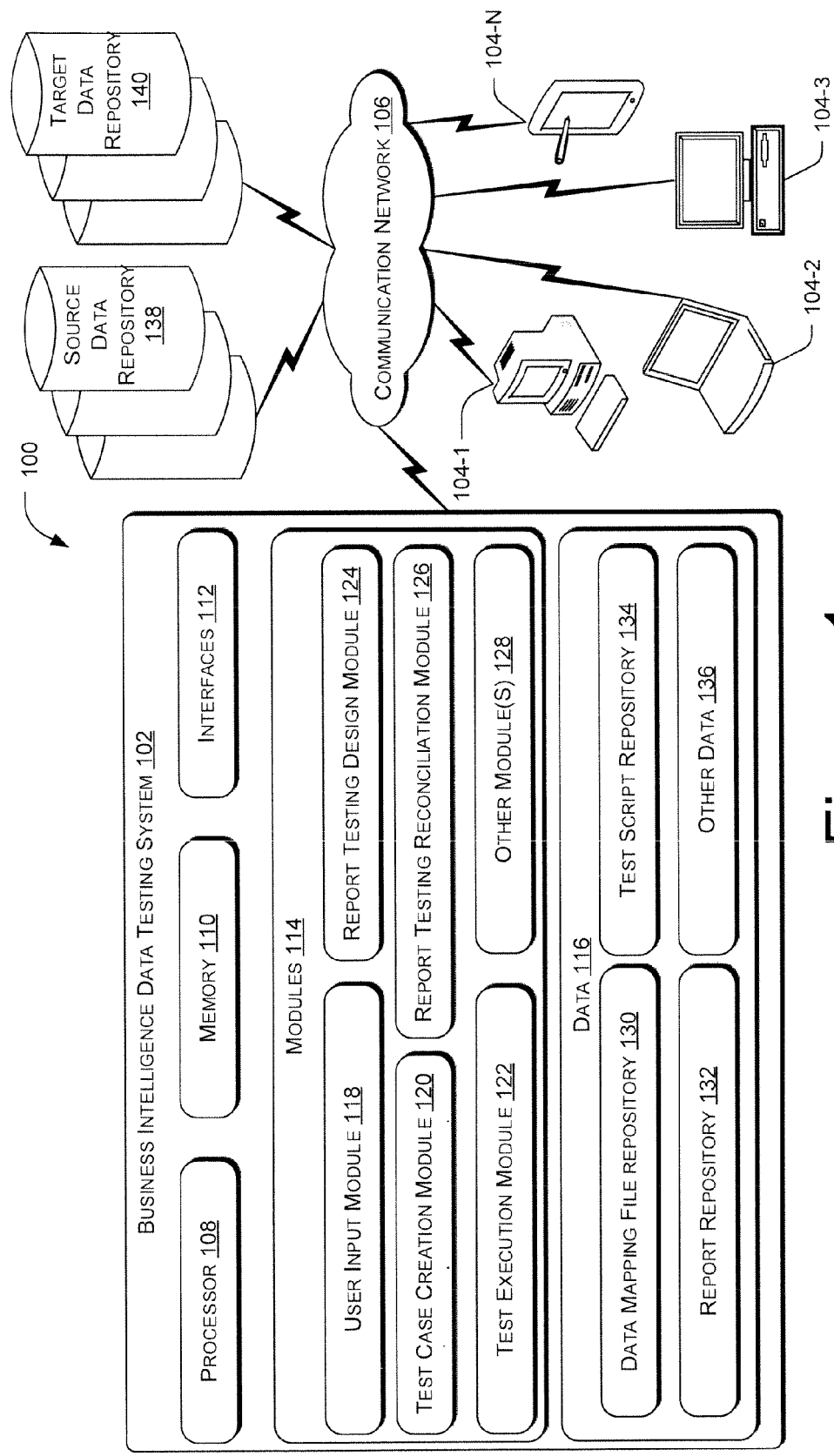
FIG. 1 illustrates a network environment implementing a business intelligence data testing apparatus for testing business intelligence data in a communication network environment, according to some embodiments of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Systems and methods for testing business intelligence data are described herein. The systems and methods may be implemented in a variety of computing systems. The computing systems that can implement the described method(s) include, but are not limited to a server, a desktop personal computer, a notebook or a portable computer, a mainframe computer, and in a mobile computing environment. Although the description herein is with reference to certain computing systems, the systems and methods may be implemented in other computing systems, albeit with a few variations, as will be understood by a person skilled in the art.

Testing business intelligence data is a complex task. Generally, testing of business intelligence data comprises two phases namely extract, transform, and load (ETL) testing and reports testing. Each of these phases may be further divided into a test scripting stage and a test execution stage. The conventional techniques of testing of business intelligence data is a tedious, monotonous and time-consuming activity, often subject to errors, due to various reasons, such as inadequate coverage of test scenarios, constraints of time, and the high number of test cases required to provide complete test coverage.

The conventional techniques of testing business intelligence data usually involve manual intervention, especially at the test creation stage, as the testers have to obtain a deep understanding of the data repositories, i.e. the data warehouses and databases, in which the data relevant to business intelligence is stored. Further, the conventional techniques also do not cater to the complex query requirements of business intelligence data testing.

Further, report testing in data warehouses is also complicated as the objectives or the requirements of the reports are always changing. Moreover, the different types of data appearing on the report like absolute value, aggregate value, summarized value and calculated values pose different testing challenges which are difficult to address. Additionally the report testing also involves verifying the format of the reports. Thus, the conventional techniques of business intelligence data testing involve a high amount of manual intervention which makes the testing process time consuming, tedious, and error-prone.

The present subject matter discloses systems and methods for testing business intelligence data in a communication network environment. In one implementation, the business intelligence data testing (BIDT) system performs automated business intelligence data testing by generating the test cases for the different ETL stages based on a data mapping file as a feed. The BIDT system further generates standard query language (SQL) for automated execution of the test cases, and performs automated testing of the data warehouse reports by using a data warehouse cube as a feed.

In operation, in an example, the BIDT system receives parameters pertaining to a source data repository and a target data repository. The parameters may be understood to include authentication details which facilitate the BIDT system to connect with the source and the target data repositories. For example, the parameters may include the username and password of the data repositories, the internet protocol (IP) address of the data repositories, the port on which the data repositories are operating and so on. It may be understood that the target data repository may act as the source data repository and vice-versa based on the application, of the organization, from whose perspective the testing of business intelligence data is being conducted. For example, customer master data management (MDM) may be the target repository from the perspective of the accounts application but may be the source data repository from the perspective of the payments application.

The BIDT system then receives a data mapping file applicable to the source data repository and the target data repository. The data mapping file maps the corresponding fields or columns of the source data repository and the target data repository, and the transformation logic between the corresponding fields or columns of the source data repository and the target data repository. The transformation logic may be a change of data format, a mathematical operation, a Boolean operation, and so on. In certain cases, the corresponding fields or columns of the source data repository and the target data repository may be simply copied without any transformation at all.

The BIDT system then analyzes the data mapping file to determine data transformation rules. The data transformation rules are the abstraction of the transformation logic between the corresponding fields or columns of the source data repository and the target data repository. In other words, the data transformation rules may be understood to be the algorithmic representation of the transformation logic between the corresponding fields or columns of the source data repository and the target data repository. Thereafter, the BIDT system generates test cases based on the data mapping file, where each column represents the source and destination columns mapped with a transformation rule. In one example, the BIDT system performs test parameterization, and generates the test steps for each test case scenario. This ensures a complete coverage of all test scenarios and eliminates errors caused by manual intervention.

Thereafter, the BIDT system generates test scripts for executing the test cases. In one example, the BIDT system generates the SQL queries for the test scripts based on the parameters provided by the user. In one example, the BIDT system provides the tester with the option of selecting the corresponding tables and their columns from the two data repositories. The tester may also provide additional test parameters to the SQL queries thus, upgrading the SQL queries to a medium complex level. Examples of the additional test parameters may be group by, order by, minimum, maximum and so on.

The BIDT system then executes the test scripts to generate a test results report. In one example, the BIDT system executes the SQL scripts as per the schedule provided by the testers and notify the stakeholders of the availability of the test results report. In one example, the BIDT system may e-mail the test results report or notify the stakeholders of the availability of the test results report by e-mail or otherwise. This phase of the testing may be referred to as extract, transform, and load (ETL) testing phase.

In a parallel or sequential operation, which may be referred to as a report testing phase, the BIDT system receives OLAP parameters, for an online analytical processing (OLAP) cube, from the user. The OLAP cube may be understood to represent a shortcut for multidimensional dataset, given that OLAP cube can have an arbitrary number of dimensions comprising attributes and then the data in fact tables. Generally, the OLAP cubes are often pre-summarized across dimensions to improve query time over the data repositories, by creating the aggregate fact tables. Based on the OLAP parameters provided by the user, the BIDT system creates a look alike of a report, which is to be tested, by selecting the dimensions and fact tables from the OLAP cube and positioning the selected dimensions and fact tables in the pivot as per the report, which is to be tested. The lookalike report is henceforth referred to as the OLAP cube report. In one example, the BIDT system may provide the user with options to select the various types of data, such as aggregated and summarized data, as well as from the predefined functions, such as average and median, in the OLAP cube report.

Thereafter, the BIDT system compares each and every field of a report, which is to be tested, with the OLAP cube report per the test case details. In case, the corresponding fields of the report, which is to be tested, and the OLAP cube report match it is regarded as a "Pass". In case, there is a mismatch between the report, which is to be tested, and the OLAP cube report comparison, it is regarded as a "Fail". In one example, the BIDT system logs the details about the corresponding reason of "Fail" for further investigation by the testers. It should be noted that the ETL testing phase and the report testing phase may be performed independently. However, together the ETL testing phase and the report testing phase depict the end to end testing of business intelligence data.

Thus, the BIDT system increases the efficiency of testing and reduces the efforts involved in testing business intelligence data. The working of the systems and methods for testing business intelligence data in a communication network environment is described in greater detail in conjunction with FIG. 1-3. It should be note that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates a network environment 100 implementing a business intelligence data testing (BIDT) system 102 for validating data in a communication network environment, according to some embodiments of the present subject matter. In one implementation, the BIDT system 102 may be included within an existing information technology infrastructure of an organization. For example, the BIDT system 102 may be interfaced with the existing data warehouses, data marts, data repositories, database and file management system(s), of the organization.

The BIDT system 102 may be implemented in a variety of computing systems, such as a laptop computer, a desktop computer, a notebook, a workstation, a mainframe computer, a server, a network server, and the like. It will be understood that the BIDT system 102 may be accessed by users through one or more client devices 104-1, 104-2, 104-3, 104-N, collectively referred to as client devices 104. Examples of the client devices 104 include, but are not limited to, a desktop computer, a portable computer, a mobile phone, a handheld device, a workstation. The client devices 104 may be used by various stakeholders or end users of the organization, such as project managers, database administrators and heads of business units and departments of the organization. As shown in the figure, such client devices 104 are communicatively coupled to the BIDT system 102 through a network 106 for facilitating one or more end users to access and/or operate the BIDT system 102.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

In one implementation, the BIDT system 102 includes a processor 108, a memory 110 coupled to the processor 108 and interfaces 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The interface(s) 112 may include a variety of software and hardware interfaces, for example, a web interface, a graphical user interface, etc., allowing the BIDT system 102 to interact with the client devices 104. Further, the interface(s) 112 may enable the BIDT system 102 respectively to communicate with other computing devices, The interface(s) 112 can facilitate multiple communications within a wide variety of networks and protocol types, including wired networks, for example LAN, cable, etc., and wireless networks such as WLAN, cellular, or satellite. The interface(s) 112 may include one or more ports for connecting a number of devices to each other or to another server.

In one example, the BIDT system 102 includes modules 114 and data 116. In one embodiment, the modules 114 and the data 116 may be stored within the memory 110. In one example, the modules 114, amongst other things, include routines, programs, objects, components, and data structures, which perform particular tasks or implement particular abstract data types. The modules 114 and 116 may also be implemented as, signal processor(s), state machine(s), logic circuitries, and/or any other device or component that manipulate signals based on operational instructions. Further, the modules 114 can be implemented by one or more hardware components, by computer-readable instructions executed by a processing unit, or by a combination thereof.

In one implementation, the modules 114 further include a user input module 118, a test case creation module 120, a test execution module 122, a report testing design module 124, a report testing reconciliation module 126 and other modules 128. The other modules 128 may perform various miscellaneous functionalities of the BIDT system 102. It will be appreciated that such aforementioned modules may be represented as a single module or a combination of different modules.

In one example, the data 116 serves, amongst other things, as a repository for storing data fetched, processed, received and generated by one or more of the modules 114. In one implementation, the data 116 may include, for example, data mapping file repository 130, report repository 132, test script repository 134, and other data 136. In one embodiment, the data 116 may be stored in the memory 110 in the form of various data structures. Additionally, the aforementioned data can be organized using data models, such as relational or hierarchical data models. The other data 136 may be used to store data, including temporary data and temporary files, generated by the modules 114 for performing the various functions of the BIDT system 102.

In one implementation, the BIDT system 102 is communicatively coupled with a source data repository 138 and a target data repository 140. The source data repository 138 and the target data repository 140 may comprise one or more commercially available data storage media, such as compact discs, magnetic tapes, SATA disks, and so on. The source data repository 138 and the target data repository 140 may also implement various commercially available database management systems, such as Oracle™ Database, and Microsoft™ SQL Server. In one example, the source data repository 138 and the target data repository 140 stores raw data which may be further accessed or processed by various applications used in the organization or its clients. In one implementation, the source data repository 138 and/or the target data repository 140 may be implemented within the BIDT system 102. In one example, the source data repository 138 and/or the target data repository 140 may be understood to include data warehouses, database management systems, data marts, and so on.

In operation, the user input module 118 may generate various graphical user interfaces or command line interfaces to facilitate the tester to enter parameters pertaining to the source data repository 138 and the target data repository 140. The parameters may be understood to include authentication details which would facilitate the BIDT system 102 to connect with the source and the target data repositories 138 and 140 respectively. In one example, the parameters requested by the user input module 118 may include one or more of the username and password of the data repositories 138 and 140, the internet protocol (IP) address of the data repositories 138 and 140, the port on which the data repositories 138 and 140 are operating and so on. As mentioned earlier, the target data repository 140 may act as the source data repository 138 and vice-versa based on the application, of the organization, from whose perspective the testing of business intelligence data is being conducted.

Thereafter, the user input module 118 may generate various graphical user interfaces or command line interfaces to prompt the tester to enter a data mapping file applicable to the source data repository 138 and the target data repository 140. In another example, the user input module 118 may provide the tester with a template of the data mapping file and prompt the tester to input the values in the parameters (for example in form of placeholders) in the template of the data mapping file. Based on the values provided by the tester, the user input module 118 may generate the data mapping file. The data mapping file maps the corresponding fields or columns of the source data repository 138 and the target data repository 140, and the transformation logic between the corresponding fields or columns of the source data repository and the target data repository. The transformation logic may be a change of data format, a mathematical operation, a Boolean operation, and so on. In certain cases, the corresponding fields or columns of the source data repository 138 and the target data repository 140 may be simply copied without any transformation at all. In other words in certain cases, the values of the corresponding fields or columns of the source data repository 138 and the target data repository 140 may be an exact replica of each other. Table 1 below shows an exemplary data mapping file.

TABLE 1

| Seq. No | Source Table Name | Column Name (Source) | Data Type (Source) | Transformation | Target Table Name | Column Name (Target) | Data Type (Target) | Comments |
|---|---|---|---|---|---|---|---|---|
| 1 | SRC_TBL1 | Reporting Date | DATE | Format('MM-DD-YYYY') | TARGET_ANAL-YSIS_FACT | EFF_DT | DATE | |
| 2 | SRC_TBL1 | ENTY_ID | VARCHAR (20) | Straight Move | TARGET_ANAL-YSIS_FACT | ORGN_SHRT_NAME | VARCHAR (20) | |
| 3 | SRC_TBL1 | Partition ROP Segments | VARCHAR (20) | Straight Move | TARGET_ANAL-YSIS_FACT | PROD_PAR_1_CDE | VARCHAR (20) | |
| 4 | SRC_TBL1 | Partition Segment 2 (Level3) | VARCHAR (20) | Straight Move | TARGET_ANAL-YSIS_FACT | PROD_PAR_3_CDE | VARCHAR (20) | |
| 5 | SRC_TBL2 | Pool Id | VARCHAR (20) | LOOK UP into table - Ref_Tab(Pool) | TARGET_ANAL-YSIS_FACT | POOL_ID | CHAR (20) | |

In the table 1, depicted above as an example of the data mapping file, the column headers represent the following:

Seq. No: the sequential number of the data transforming logic or data transforming rule;

Source Table Name: the name of the table of the source repository 138 under consideration;

Column Name (Source): the column name of the table of the source repository 138 under consideration;

Data Type (Source): the classification identifying the type, such as such as real, integer or Boolean, of data stored in the column name of the table of the source repository 138 under consideration;

Transformation: the transformation logic between the corresponding fields of the source data repository 138 and the target data repository 140;

Target Table Name: the name of the table of the target repository 140 under consideration;

Column Name (Target): the column name of the table of the target repository 140 under consideration;

Data Type (Target): the classification identifying the type, such as such as real, integer or Boolean, of data stored in the column name of the table of the target repository 140 under consideration;

Comments: any additional comments or notes that may be mentioned by the tester.

Thus, the Source Table Name, Column Name (Source) denote the field of the source data repository 138 which corresponds to the field of the target data repository 140, denoted by Target Table Name, and Column Name (Target).

It should be appreciated by the readers that the aforementioned Table 1 is just an exemplary representation of the data mapping file. The tester may use any format for the data mapping file without departing from the spirit and scope of the present subject matter.

In one example, the test case creation module 120 then analyzes the data mapping file to determine data transformation rules. The data transformation rules may be understood to be the algorithmic representation of the transformation logic between the corresponding fields or columns of the source data repository and the target data repository. Thereafter, the test case creation module 120 generates test cases based on the data transformation rules. In one example, the test case creation module 120 performs test parameterization, and generates the test steps for each test case scenario. This ensures a complete coverage of all test scenarios and eliminates errors caused by manual intervention. Table 2 below shows an exemplary test case generated.

TABLE 2

| Test Name | Description | Step Name | Step Description | Expected Results | Actual Results |
|---|---|---|---|---|---|
| Test to check the source file sanity | This test validates the following: Existence of the source tables in the database. Pre-requisite: Data source/Source table(s) name specified in the mapping document must be provided by the user. | 1 | Open to the Data repository. Ex. SQL Server/Oracle etc. | The data repository should be opened. | |
| | | 2 | Execute the query in the data repository: SELECT * from SRC_TBL1. | The query should be executed in the data repository. | |
| | | 3 | Verify that the table exists in the database. Verify the output of the query. | The output should be the table SRC_TBL1 with all the columns and its values. | |
| | | 4 | Open to the Data repository. Ex. SQL Server/Oracle etc. | The data repository should be opened. | |
| | | 5 | Execute the query in the data repository: SELECT * from SRC_TBL2. | The query should be executed in the data repository. | |
| | | 6 | Verify that the table exists in the database. Verify the output of the query. | The output should be the table SRC_TBL2 with all the columns and its values. | |
| Test to check the accuracy of source to target mapping | This test validates that the values of the source fields are mapped to the target fields as specified in the mapping document. Pre-requisite: The following must be defined and opened: 1. The mapping document. 2. Data Source/Source table(s) name specified in the mapping document. 3. Data target/target table name specified in the mapping document. | 1 | Read the mapping document and each source to target mapping. | The user should be able to read the mapping document and each source to target mapping given in it. | |
| | | 2 | Verify that the value of Reporting Date of the table SRC_TBL1 is processed through the transformation "Format('MM-DD-YYYY')" and matches with the value of EFF_DT of the table TARGET_ANALYSIS_FACT | The value of Reporting Date of the table SRC_TBL1 is processed through the transformation "Format('MM-DD-YYYY')" and should match with the value of EFF_DT of the table TARGET_ANALYSIS_FACT | |
| | | 3 | Verify that the value of ENTY_ID of the table SRC_TBL1 matches with the value of ORGN_SHRT_NAME of the table TARGET_ANALYSIS_FACT | The value of ENTY_ID of the table SRC_TBL1 should match with the value of ORGN_SHRT_NAME of the table TARGET_ANALYSIS_FACT | |
| | | 4 | Verify that the value of Partition ROP Segments of the table SRC_TBL1 matches with the value of PROD_PAR_1_CDE of the table TARGET_ANALYSIS_FACT | The value of Partition ROP Segments of the table SRC_TBL1 should match with the value of PROD_PAR_1_CDE of the table TARGET_ANALYSIS_FACT | |

TABLE 2-continued

| Test Name | Description | Step Name | Step Description | Expected Results | Actual Results |
|---|---|---|---|---|---|
| | | 5 | Verify that the value of Partition Segment 2 (Level3) of the table SRC_TBL1 matches with the value of PROD_PAR_3_CDE of the table TARGET_ANALYSIS_FACT | The value of Partition Segment 2 (Level3) of the table SRC_TBL1 should match with the value of PROD_PAR_3_CDE of the table TARGET_ANALYSIS_FACT | |

In the table 2, depicted above as an example of the test cases generated, the column headers represent the following:

Test Name: denotes the name of the test which is to be performed;

Description: provides a description of the test, i.e., the functionality which is being tested;

Step Name: provides a short name or sequential number of the steps of the test;

Step Description: provides a description of the step

Expected Results: provides the expected outcome of the execution of the step;

Actual Results: herein, the actual outcome of the execution of the step is stored.

Thereafter, the test case creation module 120 generates test scripts for executing the test cases. In one example, the test case creation module 120 generates the SQL queries for the test scripts based on the parameters provided by the user. In one example, the test case creation module 120 provides the tester with the option of selecting the corresponding tables and their columns from the two data repositories. The tester may also provide additional test parameters to the SQL queries thus, upgrading the SQL queries to a medium complex level. Examples of the additional test parameters may be group by, order by, minimum, maximum and so on.

The test execution module 122 then executes the test scripts to generate a test results report. In one example, the test execution module 122 executes the test scripts as per the schedule provided the testers and notify the stakeholders of the availability of the test results report. In one example, the test execution module 122 may e-mail the test results report or notify the stakeholders of the availability of the test results report by e-mail or otherwise.

In a parallel or sequential operation, the user input module 118 receives OLAP parameters, for an online analytical processing (OLAP) cube, from the user. The OLAP cube may be understood to represent a shortcut for multidimensional dataset, given that data can have an arbitrary number of dimensions. Generally, the OLAP cubes are often pre-summarized across dimensions to improve query time over the data repositories. Based on the OLAP parameters provided by the user, the report testing design module 124 creates a look alike of a report, which is to be tested by selecting the dimension and fact tables from the OLAP cube and positioning the selected dimensions and fact tables in the pivot as per a report, which is to be tested. The lookalike report is henceforth referred to as the OLAP cube report. In one example, the report testing design module 124 may provide the user with options to select the various types of data, such as aggregated and summarized data, as well as from the pre-defined functions, such as average and median, in the OLAP cube report.

Thereafter, the report testing reconciliation module 126 compares each and every field of the report, which is to be tested, with the OLAP cube report as per the test case details. In case, the corresponding fields of the report, which is to be tested, and the OLAP cube report match, the report testing reconciliation module 126 regards the same a "Pass". In case, there is a mismatch between the report, which is to be tested, and the OLAP cube report comparison, the report testing reconciliation module 126 regards the same as a "Fail". In one example, the report testing reconciliation module 126 logs the details, for example in form of a comparison log, about the corresponding reason of "Fail" for further investigation by the testers.

Thus, the BIDT system 102 provides extensive test coverage of business intelligence data testing and minimizes manual intervention. This reduces the scope of human error as well as makes the process of business intelligence data testing efficient and simple. The detailed working of the BIDT system 102 is further explained in conjunction with the FIGS. 2-3.

Figure 2:
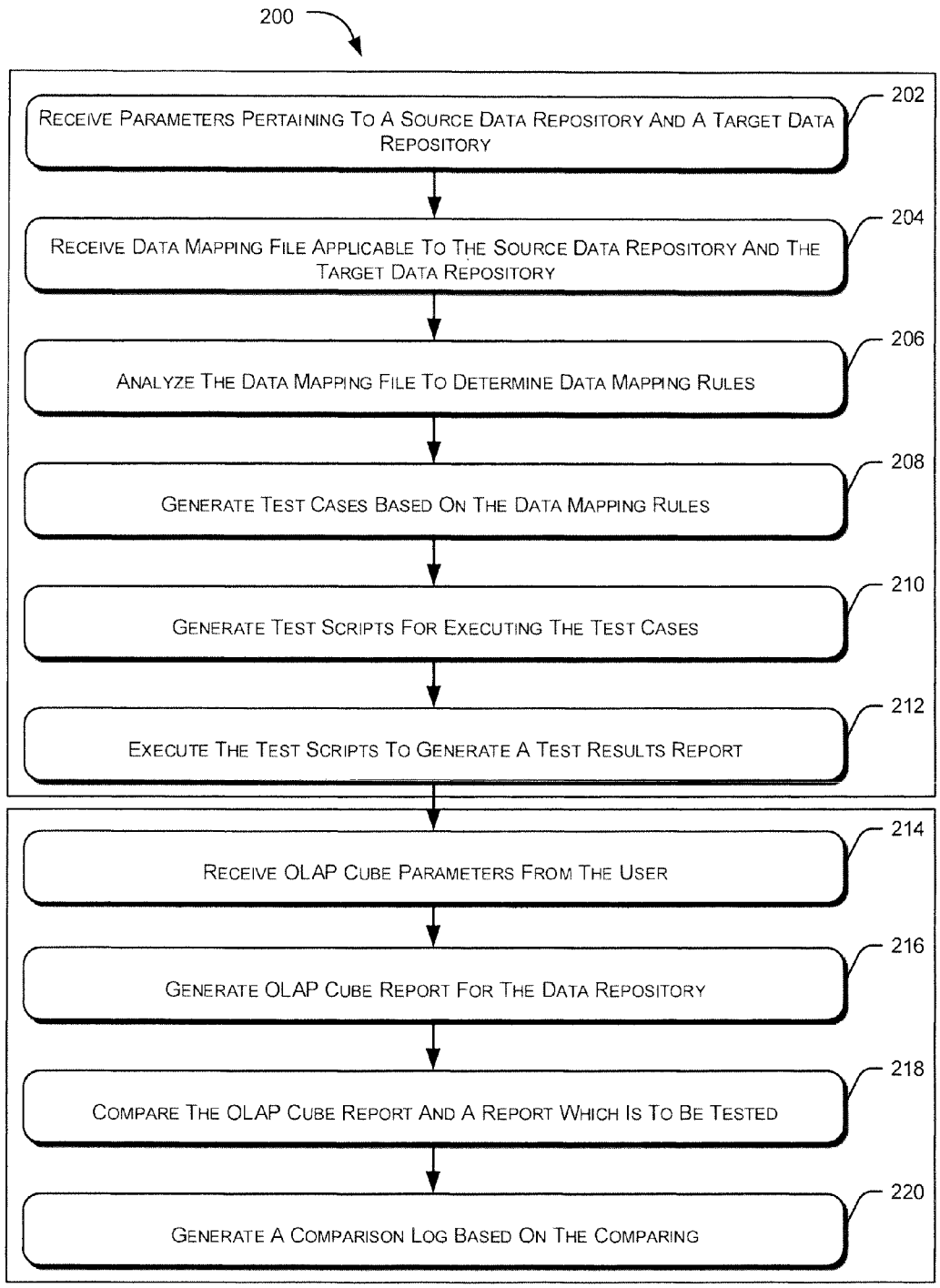
FIG. 2 illustrates exemplary computer implemented methods for testing business intelligence data in a communication network environment, according to an embodiment of the present subject matter.

FIG. 2 illustrates exemplary computer implemented methods for testing business intelligence data in a communication network environment, according to an embodiment of the present subject matter. The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof. In FIG. 2, the steps 202-212 depict the ETL testing phase and are shown in a rectangle with dotted lines, whereas the steps 214-220 depict the report testing phase and are shown in a rectangle with continuous lines.

With reference to method 200 as depicted in FIG. 2, as shown in block 202, parameters pertaining to a source data repository and a target data repository are received from a tester. In one implementation, the user input module 118 may generate various graphical user interface or command line user interface to prompt the tester to enter the parameters pertaining to the source data repository and the target data repository.

As illustrated in block 204, data mapping file, applicable to the source data repository and the target data repository, is received from the tester. In one implementation, the user input module 118 may generate various graphical user interface or command line user interface to prompt the tester to enter the data mapping file, applicable to the source data repository and the target data repository.

As depicted in block 206, the data mapping file is analyzed to determine data transformation rules. In one example, the test case creation module 120 analyzes the data mapping file to determine data transformation rules. In one example, the test case creation module 120 may parse the data mapping file to ascertain the corresponding fields of the source data repository and the target data repository and the transformation logic between the values of the corresponding fields. The transformation logic may be any mathematical operation, any Boolean operation, a change in data format, or simply a copy-paste. Based on the transformation logic between the values of the corresponding fields, the test case creation module 120 determines the data transformation rules between the corresponding fields of the source data repository and the target data repository.

At block 208, test cases are generated based on the data mapping file. In one implementation, the test case creation module 120 generates the test cases based on the data mapping file comprising direct mapping between columns or complex transformation rules. In one example, the test case creation module 120 identifies test scenarios based on the data definitions and thereafter generates test cases for each of the identified test scenarios.

As shown in block 210, SQL scripts, for executing the test cases, are generated. In one example, the test execution module 122 generates SQL scripts for the execution of the test cases as per the schedule of testing provided by the tester.

As depicted in block 212, the SQL scripts are executed to generate a test results report. In one example, the test execution module 122 executes the SQL scripts as per the schedule and generates a test results report which is indicative of the outcome of the execution of the test cases.

At block 214, OLAP cube parameters are received from the tester. In one example, the user input module 118 may generate various graphical user interface or command line user interface to prompt the tester to enter the OLAP cube parameters.

As illustrated in block 216, OLAP cube report is generated for the data repository based on the OLAP cube parameters. In one example, the report testing design module 124 creates the OLAP cube report, which is a look alike of the report, which is to be tested, by selecting the dimensions and fact tables from the OLAP cube and positioning the selected dimensions and fact tables in the pivot as per the report, which is to be tested. In one example, the report testing design module 124 may provide the user with options to select the various types of data, such as aggregated and summarized data, as well as from the pre-defined functions, such as average and median, in the OLAP cube report.

As shown in block 218, the OLAP cube report and a report, which is to be tested, are compared. In one example, the report testing reconciliation module 126 compares each and every field of the report, which is to be tested with the OLAP cube report per the test case details. In case, the corresponding fields of the report, which is to be tested, and the OLAP cube report match, the report testing reconciliation module 126 regards the same as a "Pass". In case, there is a mismatch between the report, which is to be tested, and the OLAP cube report compare, the report testing reconciliation module 126 regards the same as a "Fail".

As depicted in block 220, a comparison log is generated based on the comparing. In one example, the report testing reconciliation module 126 generates the comparison log which stores the details about the corresponding reason of "Fail" for further investigation by the testers.

Computer System

Figure 3:
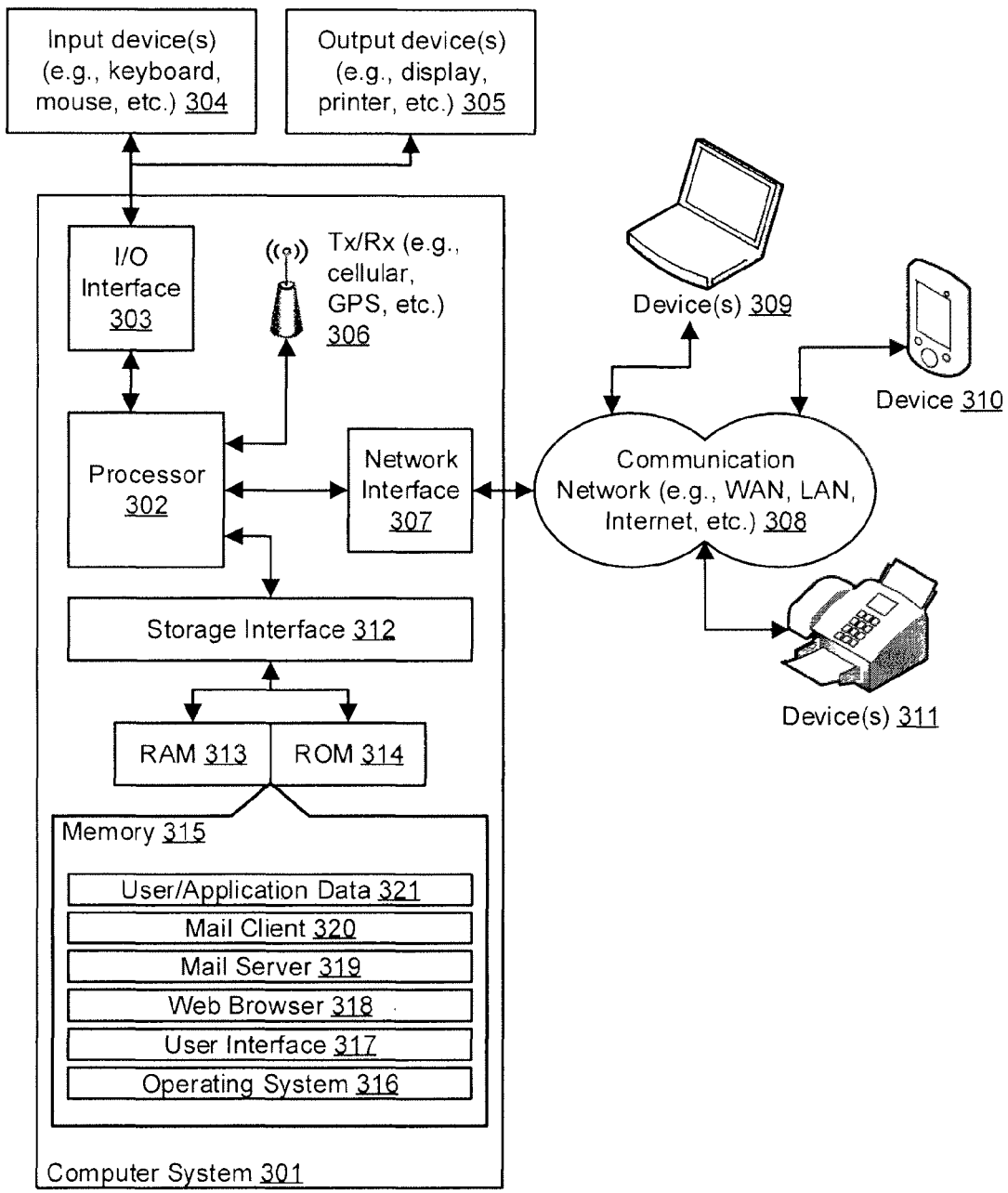
FIG. 3 is a block diagram of an exemplary computer system for implementing embodiments consistent with the present disclosure.

FIG. 3 is a block diagram of an exemplary computer system for implementing embodiments consistent with the present disclosure. Variations of computer system 301 may be used for implementing any of the devices presented in this disclosure. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 318-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol); secure sockets layer (SSL), Transport Layer Security (TLS), etc. Web browsers may utilize facilities such as AJAX, DHTML, Adobe Flash, JavaScript, Java; application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and a system for validating data in a communication network environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A business intelligence data testing apparatus comprising:
    a processor; and
    a memory communicatively coupled to the processor, wherein the memory comprises processor-executable instructions stored in the memory, which, on execution by the processor, cause the processor to:
        generate one or more test cases and one or more test scripts, for execution of the test cases, based on a data mapping file associated with a source data repository and a target data repository;
        execute the test scripts on the source data repository and the target data repository;
        generate and output a test results report indicative of the outcome of the execution of the test scripts;
        receive one or more online analytical processing (OLAP) parameters and generate an OLAP cube report for the target data repository based on the parameters, wherein the OLAP cube report is summarized across one or more dimensions based on contents of the target data repository;
        compare the OLAP cube report and another report, which is to be tested, based on the test cases to determine when one or more fields in the OLAP cube report do not match one or more corresponding fields in the another report; and
        generate and output a comparison report based on the comparison, wherein the comparison report indicates the one or more fields of the OLAP cube report, when the determining indicates that the one or more fields in the OLAP cube report do not match the one or more corresponding fields in the another report.

2. The apparatus as claimed in claim 1, wherein the instructions, on execution by the processor, further cause the processor to:
    generate a data mapping file template;
    receive one or more values of one or more parameters in the data mapping file template; and
    generate the data mapping file based on the received values.

3. The apparatus as claimed in claim 1, wherein the test scripts comprise structured query language (SQL) scripts and the instructions, on execution by the processor, further cause the processor to create the SQL scripts on validating the data mapping file based on at least one of one or more schemas of the source data repository or the target data repository, user input, or one or more data transformation rules in the data mapping file.

4. The apparatus as claimed in claim 1, wherein the instructions, on execution by the processor, further causes the processor to:
    compare one or more values of one or more corresponding fields of one or more of the source data repository or the target data repository;
    determine at least one data transformation rule based on the comparison, wherein the data mapping file comprises the at least one transformation rule; and
    generate the test cases or test scripts based on the at least one data transformation rule in the data mapping file.

5. The apparatus as claimed in claim 1, wherein the instructions, on execution by the processor, further cause the processor to:
    analyze the another report to determine the dimensions of the another report; and
    generate the OLAP cube report with dimensions corresponding to the determined dimensions of the another report.

6. A method for data repository report testing, the method comprising:
    generating, by the business intelligence data testing apparatus, one or more test cases and one or more test scripts, for execution of the test cases, based on a data mapping file associated with a source data repository and a target data repository;
    executing, by the business intelligence data testing apparatus, the test scripts on the source data repository and the target data repository;
    generating and outputting, by a business intelligence data testing apparatus, a test results report indicative of the outcome of the execution of the test scripts;
    receiving, by the business intelligence data testing apparatus, one or more online analytical processing (OLAP) parameters and generating an OLAP cube report for the target data repository based on the parameters, wherein the OLAP cube report is summarized across one or more dimensions based on contents of the target data repository;
    comparing, by the business intelligence data testing apparatus, the OLAP cube report and another report, which is to be tested, based on the test cases to determine when one or more fields in the OLAP cube report do not match one or more corresponding fields in the another report; and
    generating and outputting, by the business intelligence data testing apparatus, a comparison report based on the comparison, wherein the comparison report indicates the one or more fields of the OLAP cube report, when the determining indicates that the one or more fields in the OLAP cube report do not match the one or more corresponding fields in the another report.

7. The method as claimed in claim 6, further comprising:
    generating, by the business intelligence data testing apparatus, a data mapping file template;
    receiving, by the business intelligence data testing apparatus, one or more values of one or more parameters in the data mapping file template; and
    generating, by the business intelligence data testing apparatus, the data mapping file based on the received values.

8. The method as claimed in claim 6, wherein the test scripts comprise structured query language (SQL) scripts and the method further comprises creating, by the business intelligence data testing apparatus, the SQL scripts on validating the data mapping file based on at least one of one or more schemas of the source data repository or the target data repository, user input, or one or more data transformation rules in the data mapping file.

9. The method as claimed in claim 6, further comprising:
comparing, by the business intelligence data testing apparatus, one or more values of one or more corresponding fields of one or more of the source data repository or the target data repository;
determining, by the business intelligence data testing apparatus, at least one data transformation rule based on the comparison; and
generating, by the business intelligence data testing apparatus, the test cases or test scripts based on the at least one data transformation rule in the data mapping file.

10. The method as claimed in claim 6, further comprising:
analyzing, by the business intelligence data testing apparatus, the another report to determine the dimensions of the another report; and
generating, by the business intelligence data testing apparatus, the OLAP cube report with dimensions corresponding to the determined dimensions of the another report.

11. A non-transitory computer readable medium comprising a set of computer executable instructions, which, when executed by a processor causes the processor to perform steps comprising:
generating one or more test cases and one or more test scripts, for execution of the test cases, based on a data mapping file associated with a source data repository and a target data repository;
executing the test scripts on the source data repository and the target data repository;
generating and outputting a test results report indicative of the outcome of the execution of the test scripts;
receiving one or more online analytical processing (OLAP) parameters and generating an OLAP cube report for the target data repository based on the parameters, wherein the OLAP cube report is summarized across one or more dimensions based on contents of the target data repository;
comparing the OLAP cube report and another report, which is to be tested, based on the test cases to determine when one or more fields in the OLAP cube report do not match one or more corresponding fields in the another report; and
generating and outputting a comparison report based on the comparison, wherein the comparison report indicates the one or more fields of the OLAP cube report, when the determining indicates that the one or more fields in the OLAP cube report do not match the one or more corresponding fields in the another report.

12. The non-transitory computer readable medium as claimed in claim 11, wherein the computer executable instructions, when executed by the processor, further cause the processor to perform one or more additional steps comprising:
generating a data mapping file template;
receiving one or more values of one or more parameters in the data mapping file template; and
generating the data mapping file based on the received values.

13. The non-transitory computer readable medium as claimed in claim 11, wherein the test scripts comprise structured query language (SQL) scripts and the computer executable instructions, when executed by the processor, further cause the processor to perform one or more additional steps comprising creating the SQL scripts on validating the data mapping file based on at least one of one or more schemas of the source data repository or the target data repository, user input, or one or more data transformation rules in the data mapping file.

14. The non-transitory computer readable medium as claimed in claim 11, wherein the computer executable instructions, when executed by the processor, further cause the processor to perform one or more additional steps comprising:
comparing one or more values of one or more corresponding fields of one or more of the source data repository or the target data repository;
determining at least one data transformation rule based on the comparison; and
generating the test cases or test scripts based on the at least one data transformation rule in the data mapping file.

15. The non-transitory computer readable medium as claimed in claim 11, wherein the computer executable instructions, when executed by the processor, further cause the processor to perform one or more additional steps comprising;
analyzing the another report to determine the dimensions of the another report; and
generating the OLAP cube report with dimensions corresponding to the determined dimensions of the another report.

* * * * *